UNITED STATES PATENT OFFICE.

WILLEM JANSEN JAN HENDRIKSZOON, OF THE HAGUE, NETHERLANDS.

PROCESS OF MAKING A SOLUTION OF OXYHEMOGLOBIN.

No. 840,326.            Specification of Letters Patent.            Patented Jan. 1, 1907.

Application filed October 28, 1905. Serial No. 284,829.

*To all whom it may concern:*

Be it known that I, WILLEM JANSEN JAN HENDRIKSZOON, a subject of the Queen of the Netherlands, residing at the Hague, in the Kingdom of the Netherlands, have invented a new and useful Manufacture of a Solution of Oxyhemoglobin, of which the following is a specification.

My invention relates to a method of producing a solution of oxyhemoglobin, which method permits the complete recovery of all the hemoglobin from the blood-corpuscles without the use of any ether, which latter was hitherto necessary in the known methods. The complete extraction of the hemoglobin or the oxyhemoglobin is effected in the simplest manner and, moreover, renders possible the complete separation of the stroma.

My new method is as follows: From the freshly-collected blood first a paste of blood-corpuscles is made in any known manner, be it by centrifugalizing or by letting the blood stand, or in any other manner, and by separating the blood-serum. This paste is then mixed with a solution of common salt in water, and the mixture is in a known manner centrifugalized, preferably three times, so as to free it from every trace of serum. The mass of blood-corpuscles so obtained is thereupon treated in a suitable shaking-machine with finely-cut asbestos and water. The blood-corpuscles will thereby be completely broken up and all the hemoglobin will dissolve in the solution. Afterward the whole is filtered, when the asbestos will retain all the stroma, so that a solution of oxyhemoglobin perfectly free from stroma is obtained, which solution is of considerable value for the manufacture of articles of food. The residue on the filter may be dried and calcined for recovering the asbestos.

The new method renders it possible to manufacture the solution of oxyhemoglobin in large quantities in a simple and cheap manner.

Rye bread prepared from flour and oxyhemoglobin cannot be distinguished from ordinary rye bread as far as its appearance is concerned; but it is a fine nourishing and strengthening very digestible article of food both for strong persons or invalids.

Solidified oxyhemoglobin in a powdery condition can be mixed with milk, cocoa, chocolate, or the like, also with a soup, and can be readily consumed.

Chocolate and sugar containing oxyhemoglobin are not only favorite delicacies, but also nourishing and palatable for weak and bloodless children.

What I claim as my invention, and desire to secure by Letters Patent, is—

1. The method of manufacturing a solution of oxyhemoglobin, which consists in separating the blood-serum from freshly-collected blood in any known manner, mixing the paste of blood-corpuscles so obtained with a solution of common salt in water, freeing the mixture from all traces of serum by centrifugalizing, next shaking the centrifugalized mass with finely-cut asbestos and water, and finally in filtering the whole, so that the solution of oxyhemoglobin is obtained.

2. The method of manufacturing a sulotion of oxyhemoglobin, which consists in centrifugalizing freshly-collected blood and thereby eliminating the blood-serum, then mixing the paste of blood-corpuscles so obtained with a solution of common salt in water, freeing the mixture from all traces of serum by centrifugalizing, next shaking the centrifugalized mass with finely-cut asbestos and water, so that the blood-corpuscles will be broken up and all the hemoglobin will dissolve in the solution, and finally in filtering the whole, so that the asbestos will retain the stroma and the filtrate will be a solution of oxyhemoglobin free from stroma.

3. The step in the manufacture of a solution of oxyhemoglobin, which consists in freeing a paste of blood-corpuscles from all traces of serum by mixing it with a solution of common salt in water and by centrifugalizing the mixture, next shaking the centrifugalized mass with finely-cut asbestos and water, and finally in filtering the whole, whereby a solution of oxyhemoglobin free from stroma is obtained.

In testimony whereof I have signed my name to this specification in the presence of two subscribing witnesses.

WILLEM JANSEN JAN HENDRIKSZOON.

Witnesses:
    AIVE H. VOORWINDEN,
    JOHANNES D. FÜHRING.